Figure 2A:
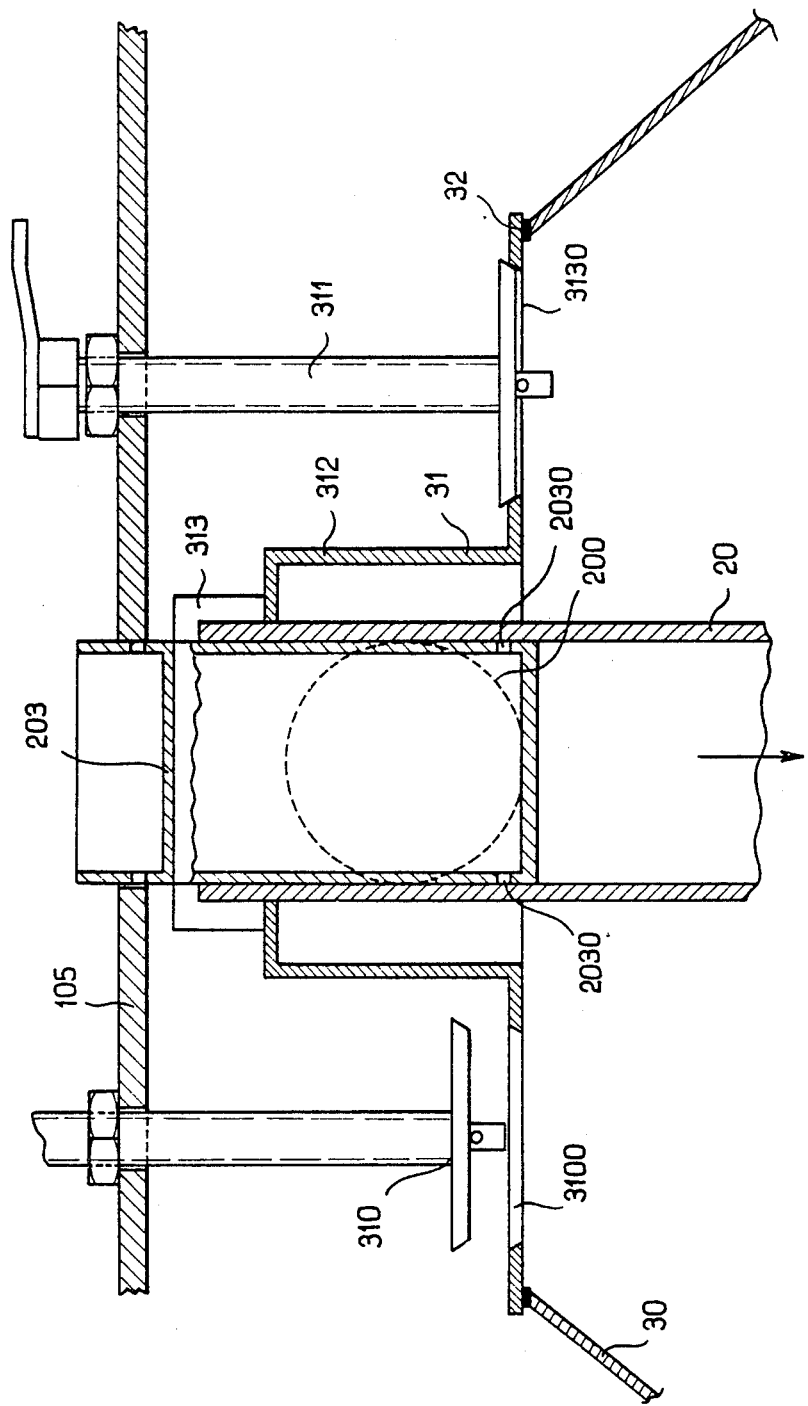

United States Patent [19]

Wenmaekers

[11] Patent Number: 4,856,988
[45] Date of Patent: Aug. 15, 1989

[54] HIGH-PRECISION MELTING AND METERING ASSEMBLY FOR MELTABLE OR LIQUID MATERIAL

[76] Inventor: Paul Wenmaekers, 22 bis Avenue de Suffren, 75015 Paris, France

[21] Appl. No.: 142,922

[22] Filed: Jan. 12, 1988

[30] Foreign Application Priority Data

Jan. 16, 1987 [FR] France .................. 87 00442

[51] Int. Cl.$^4$ .................................................. F27B 5/14
[52] U.S. Cl. ...................................... 432/210; 432/211
[58] Field of Search .............. 432/210, 211, 161; 34/73

[56] References Cited

U.S. PATENT DOCUMENTS

| | | | |
|---|---|---|---|
| 1,657,508 | 1/1928 | Keene | 432/210 |
| 2,464,508 | 3/1949 | Holden | 432/210 |
| 3,235,348 | 2/1966 | Witcher | |
| 3,947,240 | 3/1976 | Pfahl, Jr. | 432/210 |
| 4,161,391 | 7/1979 | Parker | 432/210 |
| 4,325,693 | 4/1982 | Ackermann et al. | 432/210 |
| 4,747,218 | 5/1988 | Saint Martin | 432/210 |

FOREIGN PATENT DOCUMENTS

| | | |
|---|---|---|
| 0195695 | 9/1986 | European Pat. Off. . |
| 913218 | 7/1949 | Fed. Rep. of Germany . |
| 2359635 | 2/1978 | France . |
| 2403547 | 4/1979 | France . |
| 8502241 | 8/1986 | France . |

Primary Examiner—Henry C. Yuen

[57] ABSTRACT

The invention relates to a melting and metering assembly for meltable or liquid material.

The melting and metering assembly comprises a tank/furnace (1) making it possible to heat the material in order to bring it to the melted or liquid state. It also possesses an intake nozzle (10) and a draw-off nozzle (11) for a flotation fluid for the meltable or liquid material, the nozzle (10, 11) being arranged at the base of the tank/furnace (1). The tank/furnace also has means (2) for drawing off the melted meltable or liquid material by overflow and means (3) for protecting the means (2) for drawing off by overflow, making it possible to prevent the latter from being blocked by the unmelted meltable material. The invention is put into practice in apparatuses for the continuous production of emulsion used in the composition of pharmaceutical and/or nutritious products.

19 Claims, 5 Drawing Sheets

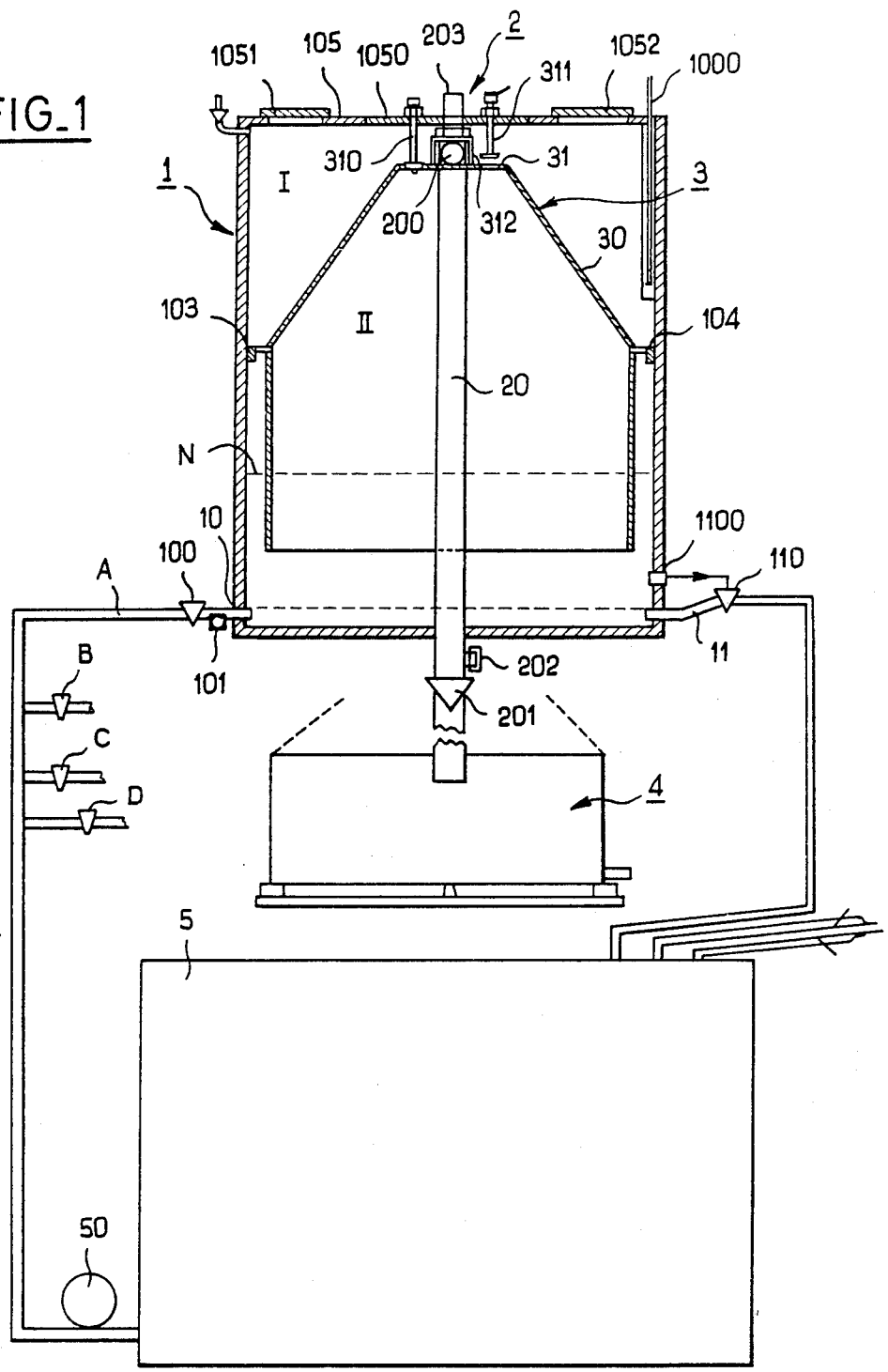
FIG_1

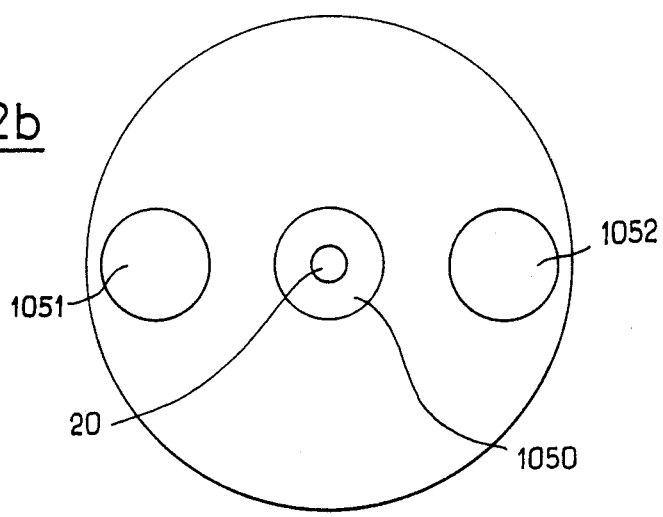
FIG_2b
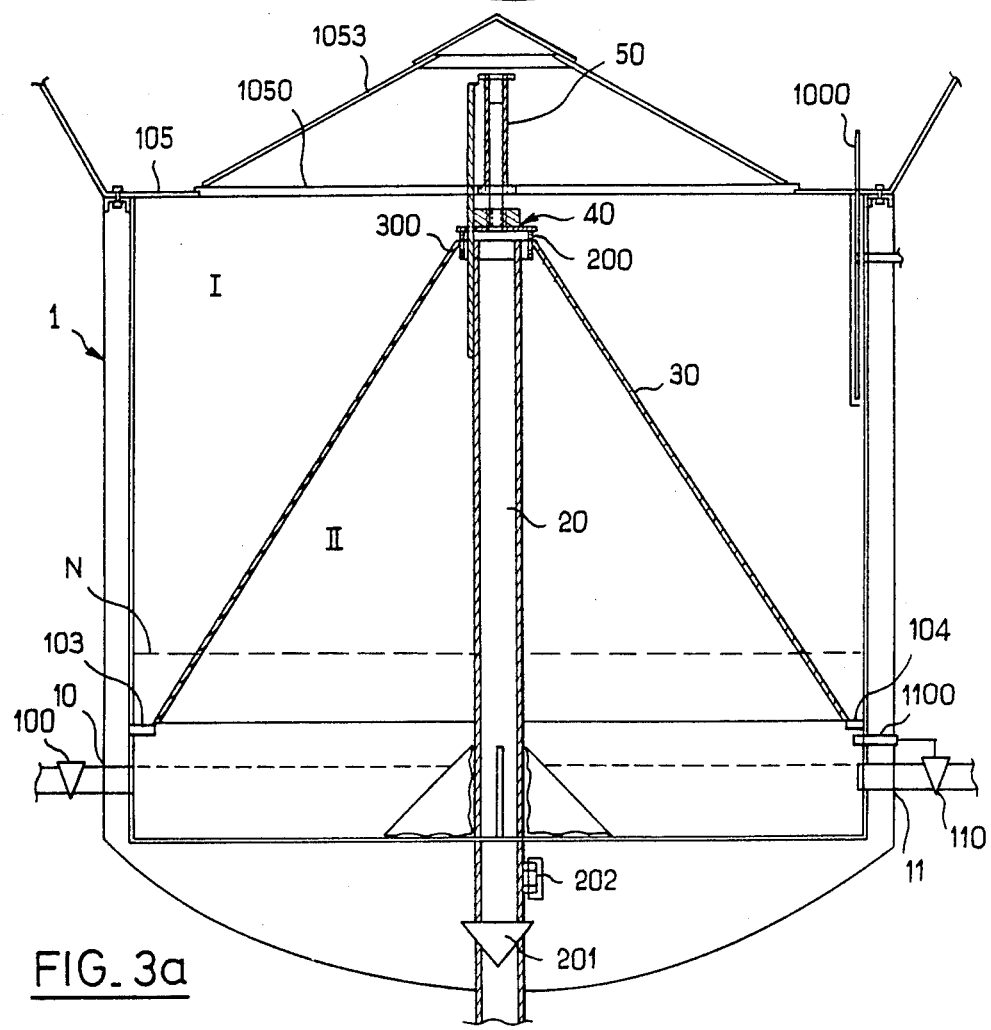
FIG_3a

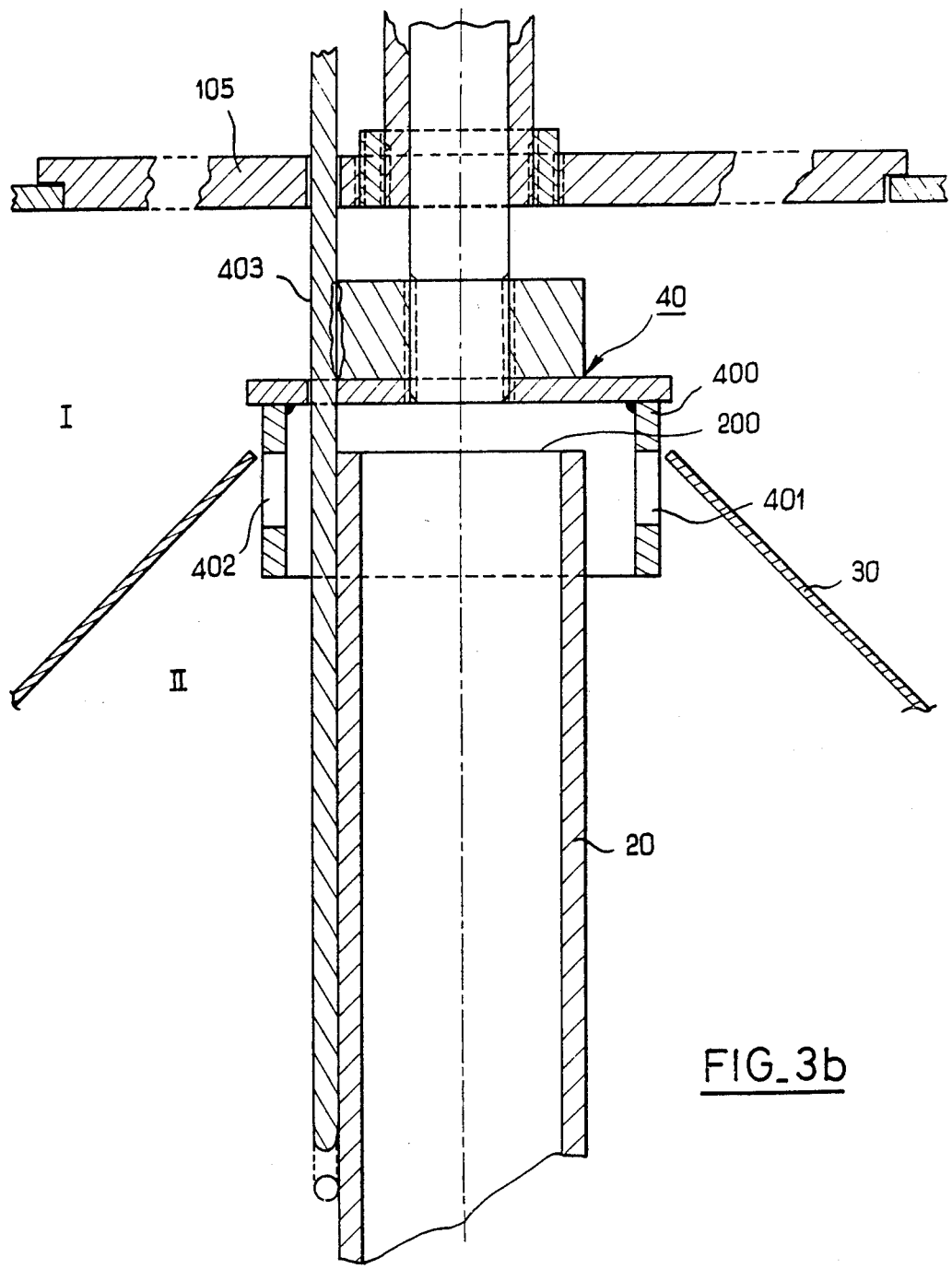
FIG_3b

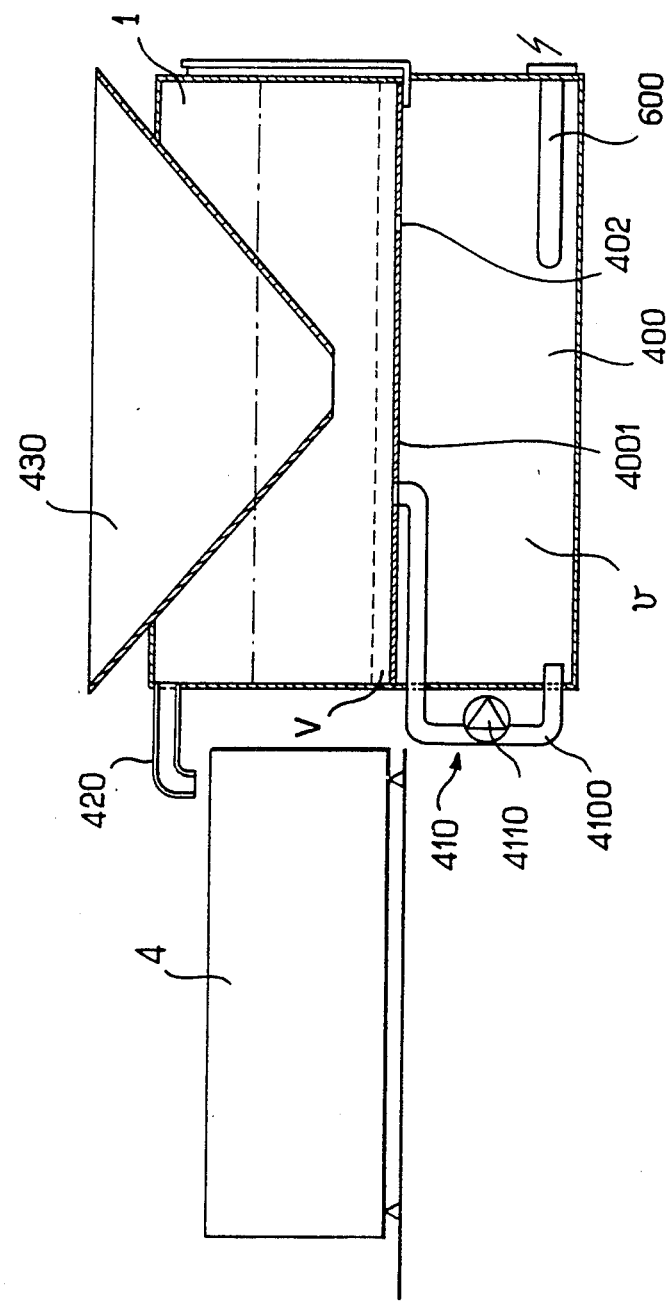
FIG_4

HIGH-PRECISION MELTING AND METERING ASSEMBLY FOR MELTABLE OR LIQUID MATERIAL

The invention relates to a precision melting and metering assembly for meltable or liquid material.

Precision melting and metering assemblies are used, at the present time, for the preparation and metering of meltable or liquid bodies or materials for producing, on an industrial scale, emulsions used in the composition of pharmaceutical or nutritious products.

A process and an apparatus for the continuous high-precision production of well-known pharmaceutical products, this process and apparatus being computerised, known by the registered trade mark "BIAFINE", were described in French Patent Application 85.02,241 filed on February 15th 1985 in the applicant's name. The process and apparatus described in the abovementioned patent application make it possible to achieve virtually continuous production of the abovementioned product, the product obtained having a high degree of quality and homogeneity.

In the process and apparatus described in this patent application, the various components of the emulsion are dispensed from melters of conventional type, the metering of these components in proportions by mass being carried out by means of a weighing device of the electronic balance type. However, for continuous use, this type of equipment requires detailed monitoring of the melters of conventional type and particularly of the rate of flow of the melted products, in order to produce uniform castings in terms of both the homogeneity of the melted products and the time required for the sequential execution of the various steps of the process.

The object of the present invention is to provide a melting and metering assembly capable of being used advantageously in the apparatus and process described in the abovementioned patent application, an acceleration of the melting time for a melter loaded completely with unmelted meltable materials being achieved.

Another object of the present invention is to provide a melting and metering assembly making it possible to avoid any risk of clogging of the flow conduits for the melted material, the rate of flow and the time required for the sequential execution of the dispensing and metering of the melted material thereby being made substantially uniform for a given material.

Yet another object of the present invention is to provide a melting and metering assembly, in which high homogeneity of the melted material is obtained as a result of thorough heating of the material.

The melting and metering assembly for meltable or liquid material, which is the subject of the invention, has a tank/furnace making it possible to heat the material in order to bring it to the melted or liquid state. It is notable in that the tank/furnace also possesses an intake nozzle and a draw-off nozzle for a flotation fluid for the meltable or liquid material, the said nozzles being arranged at the base of the tank/furnace, means for drawing off the said melted meltable or liquid material by overflow, and means for protecting the said means for drawing off by overflow, making it possible to prevent the latter from being blocked by the unmelted meltable material.

The invention is used for the metering of meltable or liquid products, especially in apparatuses or installations for the continuous production of emulsions used in the composition of pharmaceutical or nutritious products.

Figure 5:
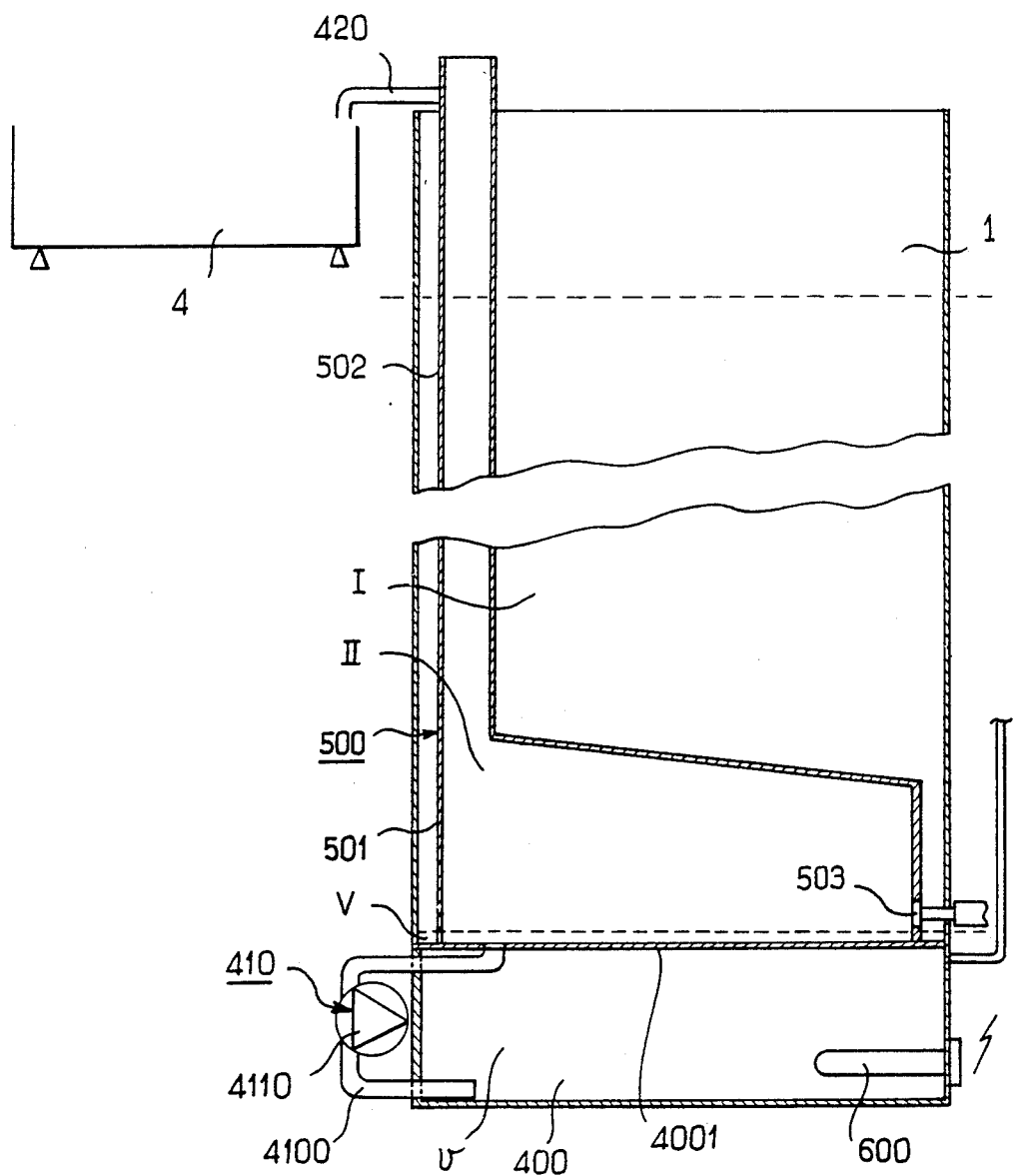

It will be understood better from a reading of the description and from an examination of the following drawings, in which:

FIG. 1 shows in partial longitudinal section, in a rotational plane of symmetry, a melting and metering assembly which is the subject of the invention, FIG. 2a shows, in a partial section along the same plane of symmetry as in FIG. 1, an advantageous detail of the embodiment of the melting and metering assembly according to the invention shown in FIG. 1, FIG. 2b shows a plan view of the part of the melting and metering assembly according to the invention shown in section in FIG. 1, FIG. 3a shows, in a partial section along the same plane of symmetry as in FIG. 1, an advantageous embodiment of a melting and metering assembly designed more particularly for an automatic control of the metering operation, FIG. 3b shows a detailed view of the valve system of FIG. 3a, FIG. 4 shows, in longitudinal section, a view of a melting and metering assembly for a solid material, such as waxes, according to an advantageous embodiment, FIG. 5 shows, in longitudinal section, a view of an especially advantageous melting and metering assembly for a liquid or viscous material, such as oils.

The melting and metering assembly for meltable or liquid material, which is the subject of the invention, will first be described according to the non-limiting embodiment illustrated in FIG. 1.

As will be seen in the abovementioned Figure, the melting and metering assembly which is the subject of the invention comprises a tank/furnace designated by 1, making it possible to heat the material in order to bring it to the melted or liquid state. By material is meant, of course, a meltable material capable of being made liquid as a result of melting or a liquid material for which it is or is not necessary to raise the average temperature in order to obtain a high degree of fluidity of the material in question.

In the rest of the description and in conjunction with French Patent Application No. 85.02,241 already mentioned, the meltable materials in question can be, for example, waxes, paraffins or oils for forming emulsions used in the composition of the pharmaceutical product "BIAFINE" already mentioned. Of course, other liquid materials, of which there is possibly no need to raise the average temperature, can be metered by means of the melting and metering assembly which is the subject of the invention.

According to an advantageous characteristic of the melting and metering assembly which is the subject of the invention, the tank/furnace 1 advantageously consists of a melter vessel with a heating wall and a heating bottom. The vessel with a heating wall and bottom thus constitutes a tank/furnace.

The abovementioned tank/furnace 1 also possesses an intake inlet or nozzle designated by 10 and a draw-off or outlet nozzle designated by 11 for a flotation fluid for the meltable or liquid material. The intake nozzle 10 and draw-off nozzle 11 are arranged at the base of the tank/furnace 1.

Furthermore, as will be seen in FIG. 1, means 2 for drawing off the melted meltable or liquid material by overflow are provided in the tank/furnace 1. Means 3 for protecting the means 2 for drawing off by overflow thus make it possible to prevent the latter from being blocked by the unmelted meltable material.

According to a general operating principle of the melting and metering assembly which is the subject of the invention and which was described above in relation to FIG. 1, the meltable or liquid material can be introduced into the melting and metering assembly and particularly into the tank/furnace 1 and subjected to heating by means of the latter. Furthermore, a flotation fluid is admitted into the melting and metering assembly by means of the intake nozzle 10, in order progressively to bring the melted meltable or liquid material, as a result of flotation, into the region of the means for drawing off by overflow, designated by 2. Of course, the flotation fluid can also be chosen in dependence upon the melted meltable or liquid material in question, so that the density of the flotation fluid is higher than that of the melted meltable or liquid material.

As also emerges from FIG. 1, the intake nozzle 10 and the draw-off nozzle 11 for the flotation fluid advantageously have a solenoid valve designated 100 and 110, making it possible respectively to control the intake and the draw-off of the flotation fluid. The solenoid valves 100 and 110 are solenoid valves normally available in the trade and, for example, solenoid valves of a type corresponding to those used in the apparatus described in the French Patent Application No. 85.02,241 already mentioned.

According to the non-limiting embodiment of the melting and metering assembly which is the subject of the invention, shown in FIG. 1, the means 2 for drawing off the melted meltable or liquid material by overflow advantageously comprise a tube designated 20, passing through the tank/furnace 1. The through-tube 20 has, in its upper part, an overflow orifice designated 200, allowing the melted meltable or liquid material to flow into the through-tube 20 when the free level of the melted meltable or liquid material reaches and exceeds the lower level of the overflow orifice 200 during the intake of the flotation fluid, as described above. As also emerges from FIG. 1, the through-tube 20 is equipped, outside the tank/furnace 1, with a solenoid control valve 201, making it possible to bring about or stop the flow of meltable or liquid material in order to ensure, as a result of gravity, that the desired quantity of the meltable or liquid material is drawn off. The opposite end of the through-tube 20 is advantageously equipped with a plug designated 203, capable of making it possible to close off the overflow orifice 200 when the plug 203 is in the low position.

Of course, the tube 20, in its part outside the tank/furnace 1, is connected to a weighing means designated 4 or to a vessel forming a buffer tank for the melted meltable or liquid material drawn off.

As will also be seen in FIG. 1, the means 3 for protecting the drawing-off means 2 advantageously comprise a substantially frustoconical element 30 having the form of a bell. This substantially frustoconical element 30 is fixed to the inner wall of the tank/furnace 1 by means of supports designated 103, 104. There can advantageously be three of the abovementioned supports, each support being fastened to the inner wall of the tank/furnace. The substantially frustoconical element 30 can thus be placed on the abovementioned supports and fastened to these, to ensure a good positioning and good retention of the substantially frustoconical element 30 in the tank/furnace 1.

According to an advantageous characteristic of the substantially frustoconical element 30, the latter is open in its upper part and makes it possible to subdivide the inner volume of the tank/furnace 1 into a first volume designated I and a second volume designated II which are separate from one another. The separate volumes designated I and II are delimited respectively by the inner wall of the tank/furnace 1, the level N of the flotation fluid and the outer wall of the substantially frustoconical element 30 and by the inner wall of the same frustoconical element 30 and the level N of the flotation fluid, defined above.

Furthermore, according to another advantageous characteristic of the melting and metering assembly which is the subject of the invention, the protection means 3 also possess a removable cover 31 intended for blocking the open upper part of the frustoconical element 30. As shown particularly in FIG. 1, the cover 31 has valves or vents designated 310 and 311, capable of being controlled by jacks. The removable cover 31 also has an attached central part designated 312, which, when the cover 31 is mounted on the through-tube 20, is intended to include the overflow orifice 200 in the second separate volume II. As shown especially in FIG. 1, the base of the overflow orifice 200 is located substantially at the same level as the port for the valves 310 and 311 which is made in a removable cover 31.

A more detailed description of the removable cover 31 and of the fastening of this in the region of the through-tube 20 will be given in relation to FIG. 2a. This Figure shows an enlarged view of the abovementioned removable cover 31 in the same sectional plane as in FIG. 1.

According to this Figure, the cover 31 is mounted on the through-tube 20 and is fastened to the latter in a region of its attached central part 312 by means of a nut 313. For this purpose, the through-tube 20, at its upper end, can be equipped with a thread on which the nut 313 can be engaged. Furthermore, as emerges from FIG. 2a, the closing-off means 203 can be equipped with vents designated 2030, which, in this Figure, are shown in opening position of the closing-off means 203, the overflow orifice 200 being open, and in the closing position, that is to say the low position, of the closing-off means 230, the overflow orifice 200 being closed.

It will also be seen that the valves 310 and 311 can advantageously be controlled by hydraulic or mechanical jacks of the orifices 3100, 3110 made respectively in the removable cover and forming the valves described above. Moreover, as emerges from FIG. 2a, the removable cover 31 can advantageously be equipped, on its periphery, with a gasket 32, namely a silicone gasket or plastic gasket, which makes it possible to ensure effective blocking of the open upper part of the above-described frustoconical element 30.

As also emerges from FIG. 1 and in more detail from the plan view of FIG. 2b, the tank/furnace 1 has a cover 105 in its upper part for closing the tank/furnace. The closing cover 105 is provided, on the one hand, with a central manhole, the closing element 1050 of which forms the support for the jack rods 310, 311 actuating the valves of the removable cover 31 of the frustoconical element 30 and, on the other hand, with two peripheral manholes designated 1051 and 1052. The closing element 1050 is engaged on the end of the through-tube 20.

According to an advantageous characteristic of the melting and metering assembly which is the subject of the invention, the substantially frustoconical element 30 and the removable cover 31 can consist of a material, such as stainless steel or a hard plastic, such as polyvinylchloride known as PVC. Of course, the tank 1 can also be made in the conventional way of a stainless steel. The stainless steel selected will preferably be one sold under the brand name of "INOX 135", that is to say a steel resistant to demineralised water.

According to an especially advantageous characteristic of the melting and metering assembly which is the subject of the invention, the flotation fluid is advantageously formed by a heat-exchange fluid. The temperature of the fluid admitted into the tank/furnace 1 is then in the neighbourhood of the melting temperature of the meltable material. Of course, the heat-exchange fluid can be formed by demineralised water and can advantageously come from the boiler used in the emulsion preparation apparatus described in the abovementioned French Patent Application No. 85.02,241. The demineralised water is injected from a tank designated 5 in FIG. 1, which can consist of the boiler of the installation, as mentioned above, and a feed pump designated 50.

According to a special characteristic of the melting and metering assembly which is the subject of the invention, the latter can have, in the region of the tank/furnace 1, a float designated 1000, indicating the upper level of the melted meltable or liquid material contained in the tank/furnace. This can, of course, consist of a float equipped with a graduated rod which is calibrated according to the height of the upper level of the melted meltable or liquid material contained in the tank.

According to another especially advantageous characteristic of the melting and metering assembly which is the subject of the invention, the tank/furnace 1 also possesses a detector designated 1100 for detecting the separation level between the melted meltable or liquid material and the floatation fluid, this separation level being designated by N in FIG. 1. The detector 1100 can advantageously consist of a detector of the level of electrical conductivity if the meltable materials used are waxes or paraffins which have very different levels of conductivity in relation to demineralised water. It can also consist, by way of non-limiting example, of an optical detector which makes it possible to detect the different absorption level between demineralised water and the melted meltable or liquid material.

According to an advantageous characteristic of the detector of the separation level between the melted meltable or liquid material and the flotation fluid according to the invention, the latter is capable of controlling the closing of the solenoid valve 110 for drawing off the flotation fluid at the time of a corresponding lowering of the separation level. The detailed functioning of the melting and metering assembly which is the subject of the invention, as illustrated and described above in conjunction with FIGS. 1 and 2a, 2b, will be described in relation to the abovementioned Figures.

The first loading with meltable material, such as a wax:

after the closing element 1050 of the central manhole has been taken off, the nut 313 is detached and the removable cover 31 is removed, the plug 203 being put in the low position in order to close off the overflow orifice 200. The separate volume designated II can then be filled completely and can subsequently be closed again by reinstalling the removable cover 31 and closing the valves 310 and 311. The peripheral manholes 1051 and 1052 can then allow the other separate volume designated I to be filled. Of course, before the meltable material or wax is introduced, a certain volume of water or of flotation fluid has been admitted into the tank/furnace 1, so as to define the separation level N described above in relation to FIG. 1. If desired, the separate volume I can be filled to the height of the closing cover 105.

First melting of the meltable material, such as a wax:

in the solid state, the meltable materials, such as waxes, whether these are in the form of sheets, granules, powder or chips, occupy a much larger volume than that which they will occupy in the melted state. After the melting and metering assembly has been loaded, there is therefore a large air network formed as a result of the very nature of the material, this air network slowing initial melting considerably.

After the plug 203 has been put into the position for closing off the overflow orifice 200, the flotation fluid, such as demineralised water, is injected into the tank/furnace 1, the flotation fluid consisting, as described above, of a heat-exchange fluid at the melting temperature of the meltable material in question or at a temperature in the neighbourhood of this. The fluid or demineralised water is injected up to an excess pressure value which can advantageously be detected by a pressure detector 101 arranged in the vicinity of the fluid intake nozzle 10. Detection of the excess pressure of the fluid by the pressure detector 101 makes it possible, for example, to stop the intake pump 50 automatically. The automatic stopping of the pump can be carried out in a device, such as that described in French Patent Application No. 85.02,241, by means of software designed for this purpose. Of course, the stopping of the intake of fluid can also be controlled manually.

As soon as the intake pump 50 has stopped, the fluid pressure within the tank/furnace 1 falls and it is possible to observe the melting of the meltable materials, such as waxes, for example via the periphery manholes designated 1051 and 1052.

Of course, the process of injecting the flotation fluid, namely a heat-exchange fluid, can be used successively in various loaded melters which, of course, have not been shown in FIG. 1 for the sake of simplicity, only the fluid supply lines designated A for the embodiment of FIG. 1 and then successively B, C and D for other loaded melting and metering assemblies of the same type as that illustrated in FIG. 1 having been shown. The process of injecting flotation fluid forming a heat-exchange fluid is especially advantageous in that melting is accelerated considerably thereby because of thorough heating of the batch of meltable material. After the melting of the meltable material, the tank/furnace 1 has essentially two levels, namely the separation level N between the flotation fluid and the melted meltable material and the free level of the latter comprising the melted meltable material, such as the waxes described above.

According to an alternative way of carrying out the first melting of the meltable material when metering by weighing with the weighing means 4 is to be started quickly or when there are no plans to use the entire volume of the melter, it is also possible to load only the separate volume designated I, whilst at the same time injecting a maximum volume of flotation fluid forming a heat-exchange fluid, in order to accelerate melting.

Of course, the melting and metering assembly, such as that illustrated in FIG. 1, is particularly suitable for a continuous or an intermittent mode of operation, and for example these continuous reloading operations can be carried out in the region of the peripheral manholes 1051 and 1052 by means of a dispenser of meltable material in the solid state, such as, for example, a hopper equipped with an endless screw.

At the start of production, a manual control or the software described above causes the fluid draw-off valve 110 to open, so as to bring the level of flotation fluid within the tank/furnace 1 to a minimum level. The draw-off valve 110 closes again when this level is reached, this level being detected by the detector 1100 shown in FIG. 1.

Production can then begin.

The melter weighing means 4 and its weighing reader, as described particularly in the abovementioned French Patent Application 85.02,214, makes it possible to perform controls by means of the software according to predetermined weighings.

As a non-limiting example, the mode of operation described will be considered as involving only one melting and metering assembly, such as that illustrated in FIG. 1, but it goes without saying that several melting and metering assemblies can be used.

The software can then command the starting-up of the fluid feed pump 50 and the opening of the intake valve 100, the delivery of the feed pump 50 and of the pipeline A being calculated so that one weighing lasts approximately two minutes.

The flotation fluid forming a heat-exchange fluid, such as hot demineralised water, is then injected and raises the level of meltable material, such as melted wax, which escapes via the overflow orifice 200, the plug 203 of course having been put in its opening position. The melted meltable material then flows off into the weighing means 4 by means of the valve 201. As soon as the wax mass is reached, the closing of the valves 201 and 100, the stopping of the feed pump 50 and the opening of the fluid draw-off valve 110, which will close again by automatic control, are then commanded by means of the software as a result of the triggering of the level detector 1100, as described above in the description.

If there is no reloading with meltable material in the solid state via the manholes 1051 and 1052, as described above, the injection of hot water will take place to an ever increasing extent, until the tank/furnace 1 contains virtually no more wax at all. From that moment, the production process can be stopped, the fluid level being brought to its lowest level again, the flotation fluid being brought back to substantially ambient temperature and the remaining wax or meltable material being returned to the solid state, and a stream of fluid at a lower temperature can then be generated in order to recover the film of excess solid material.

However, in continuous working or when loading with meltable material is limited to the separate volume I, the inner volume II essentially contains only melted meltable material, such as wax, and there is virtually no risk of clogging of the overflow orifice 200 by the meltable material in the solid state or by particles of this.

It will be seen that, when the melted meltable or liquid material is released via the overflow orifice 200, the level of melted meltable material rises virtually to the top of the melter and of the furnace of the tank/furnace 1. The result of this is that unmelted waxes necessarily undergo coating in the melted wax systematically.

Of course, in a non-limiting alternative embodiment, the removable cover 31 can be replaced by a removable cover not having any jacks 310, 311 or orifices 3100, 3110, without departing from the scope of the subject of the present invention, in this case the removable cover being shifted as a whole in a translational movement in order to perform the function comparable to that of the opening and closing of the valves and jacks 310, 311.

An advantageous embodiment designed more particularly for the continuous metering of meltable or liquid products will be described in relation to FIGS. 3a and 3b.

According to FIG. 3a, the element 30 is of conical shape and rests on the supports 103, 104. The cone forming the element 30 has an aperture 300 according to a circular cross-section of the cone 30. The removable cover 31 of the preceding embodiment is advantageously replaced by a plug 40 engaged on the through-tube 20. The overflow orifice 200 formed by a section of the through-tube 20 is level with the aperture 300 of the cone 30. The plug 40 is engaged between the walls of the cone 30 and of the through-tube 20 and is fixed mechanically to drive means 50 consisting of a jack, the jack body of which is fastened to the closing element 1050 of the manhole made in the cover 105. The drive means 50 allow the complete opening of the aperture 300 in the maximum upper position of the plug 40, the complete closing of the aperture 300 and of the overflow orifice 200, the plug 400 being brought to rest on the through-tube 20 and the cone 30, without exerting any appreciable force, and the opening of the closing element 1050 when, with the plug 40 bearing on the cone 30 and the through-tube 20, force is exerted by means of the jack 50, the effect of which is to cause the opening of the closing element 1050 as a result of reaction. The unmelted waxes or materials can then be introduced into the melting and metering assembly. The closing element 1050 is sufficiently heavy to ensure that, when the action of the jack 50 ceases, the closing element 1050 closes as a result of gravity.

A detail of an embodiment of the plug 40 is shown in FIG. 3b. To ensure suitable guidance of the plug in its translational movement in response to the action of the jack 50, guides 403 are provided and form a slide track on the outer wall of the through-tube 20. Furthermore, the lateral orifices 401, 402 are made in the plug 40. As shown in FIG. 3b, they make it possible to ensure that the inner volume II is put in communication with the overflow orifice 200, the inner volume I being kept isolated from these.

The embodiment illustrated in FIGS. 3a and 3b is especially advantageous in that, since closing-off takes place in the region of the overflow orifice 200, the through-tube 20 can be emptied completely, thus making it possible to ensure greater uniformity of the run-offs in terms of the sequential operating time and the type of product obtained when metering is controlled automatically.

A melting and metering assembly having a high degree of reliability because of the virtually nonexistent risk of blockage or clogging of the overflow orifice 200 has thus been described.

Moreover, the melting and metering assembly which is the subject of the invention makes it possible to obtain an acceleration of the melting time in a melter completely filled with unmelted meltable materials, such as waxes.

Furthermore, it is possible to start the weighing from a partial filling which initially excludes the separate volume I.

According to an especially advantageous characteristic, the melting and metering assembly which is the subject of the invention also makes it possible to ensure a flow of the melted meltable material at a substantially constant flow speed for a material of a particular type. In fact, the flow system by the overflow method makes it possible to ensure a constant height of the head of liquid formed by the melted meltable material, which is identical from one weighing to another. This particularly useful element thus makes it possible to obtain operating times for each weighing which are substantially identical for a particular material. This characteristic makes it possible especially to achieve particularly uniform run-offs in terms of both the type of product obtained and the sequential operating times of the various steps allowing production, as described in the abovementioned French Patent Application No. 85.02,241.

Moreover, according to an especially advantageous and useful aspect of the melting and metering assembly which is the subject of the invention, cleaning of the walls of the tank/furnace 1 with hot water can be carried out easily. The volume of hot water or of flotation fluid forming the heat-exchange fluid is recovered completely and advantageously can come from the water for producing the creams or emulsions, as described above.

In addition, as mentioned above in the description, it is particularly simple to adapt the continuous loading conditions as required, the melting rate making it possible to use smaller melters.

Although the melting and metering assembly described above is satisfactory and can operate in a suitable way, it nevertheless has a certain number of constraints.

If the melting and metering assembly is insufficiently filled with melted waxes, the metering weigher receiving the melted waxes does not discriminate between the wax and the water drawn off as a result of overflow which then fills the latter. This therefore implies the need for a high contactor actuated by a float in order to prevent such malfunctions. It is also necessary to provide a low contactor in order to close the water drainage valve without allowing the melted waxes to pass through.

The installation of several melting and metering assemblies, that is to say one for each wax, this installation being necessary for producing complex pharmaceutical products in which many components are involved, requires a considerable reserve of hot water located at a level below that of the melting and metering assemblies, to allow the water to return by overflow after the loading of the weigher. Moreover, the successive feeding of each melting and metering assembly involves the presence of two automatic valves for each melting and metering assembly and a considerable amount of pipework for the supply and return of the heating water.

The present embodiment is concerned with an improvement of the above-described melting and metering assembly, making it possible to use melting and metering assemblies of a construction which is much simpler and which involves a much lower outlay. The melting and metering assmbly for meltable or liquid material described below in conjunction with FIGS. 4 and 5 is notable in that the means for drawing off the melted meltable material by overflow consist of a hot-water tank containing the heating water of the melting and metering assembly, the tank being arranged at the base of the tank/furnace, and of the means of supplying the tank/furnace with heating water. The supply means make it possible to convey heating water into the tank/furnace temporarily at the base of the latter.

The melting and metering assembly in the abovementioned embodiment will be described in detail in terms of two non-limiting advantageous alternative embodiments.

As illustrated in FIG. 4 mentioned above, according to an especially advantageous aspect of the melting and metering assembly according to the invention, the means 2 for drawing off the melted meltable material by overflow consist of a hot-water tank 400 containing the heating water of the melting and metering assembly. The tank 400 is arranged at the base of the tank/furnace 1. Means 410 for supplying the tank/furnace with heating water are also provided, these supply means making it possible to convey heating water temporarily into the tank/furnace 1 at the base of the latter.

As also shown in FIG. 4, the tank/furnace 1 has, in its upper part, a nozzle 420 forming the end part of the means for drawing off by overflow. Of course, the volume of the hot-water tank 400 is less than the effective volume of the tank/furnace 1, the effective volume of the tank/furnace 1 being defined by the volume contained between the base of the end part of the means for drawing off by overflow, that is to say the nozzle 420, and the partition wall, designated 4001, between the tank/furnace 1 and the hot-water tank 400.

As will also be seen in FIG. 4, the volume V of heating water contained in the melting and metering assembly is greater than the volume of the hot-water tank 400, this volume being designated by v in this same Figure.

According to a non-limiting embodiment illustrated in FIG. 4, the means for supplying the tank/furnace 1 with heating water comprise a pipe designated 4100, putting the heating-water tank 400 and the tank/furnace 1 in communication by means of a feed pump 4110. Furthermore, a permanent orifice designated 402 makes it possible to put the tank/furnace 1 and the tank of hot heating water 400 in communication via the partition wall 4001 between the tank/furnace 1 and the heating-water tank 400.

To prevent the end part 420 of the means 2 for drawing off by overflow from being blocked, the melting and metering assembly which is the subject of the invention also possesses protection means designated 430 in the region of the tank/furnace 1. These protection means 430 make it possible to prevent the means for drawing off by overflow and, in particular, the end part 420 of these from being blocked by the unmelted meltable material. Advantageously, the protection means 430 form a hopper. These protection means 430 can advantageously have a frustoconical shape, as shown in FIG. 1 mentioned above.

The mode of operation of the melting and metering assembly which is the subject of the invention and which is illustrated in FIG. 4 is as follows.

The principle involving raising the level of the melted material, such as the wax or an oil, by means of hot water is preserved, but here the water used for this purpose is advantageously the heating water of the melter contained in the tank 400.

The heating water is conveyed upwards towards the tank/furnace 1 by means of the pump 4110 and the pipe 4100, whilst the return of the water is automatic via the permanent orifice 402. Of course, the flow rate of the pump 4110 and of the pipe 4100 is higher than the flow rate through the permanent orifice 402.

As a non-limiting example, according to an advantageous embodiment, for a pump 4110 having a delivery of 40 liters per minute the continuous return via the permanent orifice 402 takes place at the rate of 10 liters per minute, and by means of the nozzle 420 the melting and metering assembly then makes it possible to deliver 30 liters of melted wax per minute. The nozzle 420 thus makes it possible to feed a melter weighing means designated 4, which in this case is virtually the same level.

As shown in FIG. 4, to give a complete representation of the melting and metering assembly which is the subject of the invention means for heating the heating water are provided and are designated by 600.

Another especially advantageous embodiment of the melting and metering assembly according to the abovementioned embodiment, more particularly intended for ensuring the preheating of fluids, such as oils, this preheating being necessitated by the degree of viscosity of the latter, will be given with reference to FIG. 5.

In the abovementioned case, the tank/furnace 1 advantageously possesses means 500 for separating the fluid subjected to drawing-off by overflow.

The separation means 500 mentioned above advantageously comprised a bell-shaped part 501, the base of which is fixed sealingly to the partition wall 4001 between the tank/furnace 1 and the heating-water tank 400. A tubular part designated 502 is also provided, this tubular part being open at its upper end. The abovementioned tubular part 502 extends the bell-shaped part 501 and is connected to the end part formed by the nozzle 420 of the means for drawing off by overflow. The bell-shaped part 501 and the tubular part 502 thus subdivide the volume of the tank/furnace 1 into a first reservoir volume I and a second overflow draw-off volume II. Of course, the two abovementioned volumes, namely the volume I and the volume II are in communication by means of a valve designated 503. The valve 503 controlled by the operator manually or even automatically thus makes it possible to feed selectively the volume II forming the overflow draw-off volume. The operating principle of the melting and metering assembly, as shown in FIG. 5, is substantially identical to that shown in FIG. 1, the heating water contained in the heating-water tank 400 being conveyed into the volume formed by the bell-shaped part 501. The effect of the inflow of water into this bell-shaped part is to cause the oil to rise in the tubular part 502 and be drawn off by overflow at the nozzle 420 of the means for drawing off by overflow. The feeding of the melter weighing means 4 is thus ensured.

The valve 503 can advantageously be controlled as a function of the level of heating water in the vent determining its opening, whilst the starting-up of the pump 4110 causes the closing of the abovementioned valve 503. Of course, the volume V of heating water is then greater than the volume of the heating-water tank 400, the level of the volume V being selected so that it is contained between the orifice of the valve 503 and the partition wall 4001 between the heating-water tank 400 and the tank/furnace 1.

The embodiment of the melting and metering assembly described above with reference to FIG. 5 is especially advantaageous for the heating and dispensing of oils.

In fact, some oils need to be preheated because of their viscosity, for example avocado oil, or simply because, since they are used in large quantities in an emulsion produced hot, their heating in the melter weighing means prolongs the running time of the installation.

Moreover, for example paraffin oil, although being inexpensive at the refinery, has a high final cost price when used, because it is delivered in non-returnable drums, the mandatory physical and chemical checks involving a very high outlay and being conducted on only a very small batch at a time.

It is necessary, for economic reasons, to deliver it by tanker lorry and store it in bulky containers.

For this purpose, the tank/furnace 1 can advantageously form a large-capacity container for storing the abovementioned oils.

Irrespective of the heating problem, such containers are too heavy to be arrangeed at an upper level in relation to the melter weigher means 4, to ensure drawing-off by granimetry. Moreover, ensuring a constant level of the water would entail too high a consumption for working conditions where the water is lost, as in the preceding embodiment, or a large specific installation for recovering this water.

Applying the principle used, which is described in conjunction with FIG. 5, makes it possible to solve all the problems mentioned above.

Of course, this system can take the form illustrated in FIG. 5 in respect of a main container in order to reduce the ground area of the installation, but it is also perfectly possible to make the system independent. Likewise, if there is no heating, it is possible to use only a container segment to obtain the reduced volume.

The melting and metering assembly, as described above, is incorporated perfectly in an emulsion preparation apparatus, as described in French Patent Application No. 85.02,241, but of course can be used quite independently.

Furthermore, in a non-limiting way, the melting and metering assembly which is the subject of the invention can be adapted perfectly well for supplying fluid and light-weight products requiring no melting or heating to maintain the fluidity of the material in question.

I claim:

1. Melting and metering assembly for processing meltable solid and liquid material comprising,
   a tank/furnace (1) for heating the material and containing a quantity of flotation fluid for supporting the material to be processed,
   means for controlling the level of flotation fluid within said tank/furnace (1) including an intake inlet (10) at the base of said tank/furnace (1) for introducing flotation fluid into said tank/furnace (1) and a draw-off outlet (11) at the base of said tank/furnace (1) for removing flotation fluid from said tank/furnace (1),
   overflow means for drawing material from said tank/furnace and including a through-tube (20) extending through the wall of said tank/furnace and having an overflow orifice (200) located near the upper end of said tank/furnace (1) for allowing material to flow into said through-tube (20), a solenoid control valve (201) located outside of said tank/furnace (1) for causing and stopping the gravity flow of material from said through-tube (20), and a plug (203) for closing said overflow orifice (200),
   protecting means (3) for separating a portion of the interior of said tank/furnace (1) containing said overflow orifice (200) from the remainder of the interior of said tank-furnace (1) to prevent unmelted material from clogging said overflow orifice (200), and weighing means (4) including a vessel for receiving material from said through-tube (20) to indicate the quantity of material drawn from said tank/furnace (1) by said overflow means.

2. Melting and metering assembly according to claim 1 characterized in that said protecting means (3) comprises a substantially frustoconical element (30) having the form of a bell and fixed to said tank/furnace, said frustoconical element (30) having an opening at its upper part and subdividing said tank/furnace interior into a first volume I defined by the inner surface of said tank/furnace (1), the surface (N) of the flotation fluid, and the outer surface of said frustoconical element (30), and a second volume II defined by the inner surface of said frustoconical element (30) and the surface (N) of the flotation fluid, said overflow orifice (200) being disposed within said second volume II, a removable cover (31) forming a closure for said opening, and valve means (310,311) supported on said tank for movement between open and closed positions relative to said frustoconical element (30) to provide communication between said first volume I and said second volume II, and jacking means for moving said valve means (310,311) between said open and closed positions.

3. Melting and metering assembly according to claim 2 characterized in that said through-tube (20) is vertically oriented and extends through said removable cover (31) and said assembly includes a nut threadably engaged with said through-tube (20) for securing said cover to said frustoconical element (30).

4. Melting and metering apparatus as set forth in claim 2 wherein said frustoconical element (30) and said cover (31) are made from non-metallic material.

5. Melting and metering assembly according to claim 1, characterized in that the intake inlet (10) and the draw-off outlet (11) for the flotation fluid each have a solenoid valve (100,110) associated therewith for respectively controlling the intake and draw-off of the flotation fluid.

6. Melting and metering assembly according to claim 2, characterized in that said cover (31) is mounted on said through-tube (20) and fastened in its central region to the through-tube (20) a nut (313).

7. Melting and metering assembly according to claim 2, characterized in that the said tank/furnace (1) has a closing cover (9105) in its upper part including a central manhole and two peripheral manholes (1051,1052), said central manhole having a closing element (1050) which forms the support for said valve means (310,311), said closing element (1050) being engaged on the end of said through-tube (20).

8. Melting and metering assembly according to claim 2, characterized in that said frustoconical element (30) and said removable cover (31) are made of a hard plastic material.

9. Melting and metering assembly according to claim 1, characterized in that the flotation fluid is a heat-exchange fluid, the temperature of the said fluid introduced into the tank/furnace (1) being in the neighbourhood of the melting temperature of the said meltable material.

10. Melting and metering assembly according to claim 9, characterized in that the said fluid is demineralised water injected from a tank (5) by a feed pump (50).

11. Melting and metering assembly according to claim 1, characterized in that the tank/furnace (1) has a float (1000) indicating the upper level of the material in the tank/furnace (1).

12. Melting and metering assembly according to claim 1, characterized in that the tank/furnace (1) has detecting means (1100) for sensing the separation level between the material and the flotation fluid and operating the solenoid valve (110) in response to a predetermined lowering of the said separation level to interrupt the drawing-off of flotation fluid.

13. Melting and metering assembly for processing solid and liquid material comprising, a tank/furnace (1) for heating the material and containing a quantity of heating water for supporting the material to be processed, means for controlling the level of the heating water within the tank/furnace including a heating water tank at the base of said tank/furnace and means for circulating the heating water between said tank/furnace and said heating water tank, overflow means for drawing material from said tank/furnace including an overflow nozzle (420) having an overflow orifice communicating with the interior of said tank/furnace near the upper end thereof for allowing material to flow into and through said overflow nozzle (420), protecting means for separating a portion of the interior of said tank/furnace containing said overflow orifice from the remainder of said tank/furnace to prevent clogging of said overflow orifice, and weighing means including a vessel located above the level of said heating water tank and below the level of said overflow nozzle (420) for receiving material from said overflow nozzle (420) to indicate the quantity of material drawn from said tank/furnace by said overflow means.

14. Melting and metering assembly as set forth in claim 13 wherein said tank/furnace (1) and said heating water tank 400 are separated by a common partition wall (4001), said protecting means comprises a bell-shaped part (500) sealed at its base to the partition wall (4001) and including an upwardly extending tubular part (502) open at its upper end, said bell-shaped part subdividing the interior of said tank/furnace into a first volume I defined by the inner surface of the walls of said tank/furnace and the outer surface of said bell-shaped part and a second volume II defined by the inner surface of said bell-shaped part and an associated portion of said partition wall, and valve means associated with the wall of said bell-shaped part for providing communication between said first volume I and said second volume II, and said overflow nozzle (420) is connected to the upper end portion of said tubular part (502) to communicate with said second volume II.

15. Melting and metering assembly according to claim 13, characterized in that tank/furnace (1) has, in its upper part, a nozzle (420) forming the end part of the said means for drawing off by the volume of the heating water tank (400) is less than the effective volume of the tank/furnace (1).

16. Melting and metering assembly according to claim 13, characterized in that the volume (V) of heating water contained in the melting and metering assembly is greater than the volume (v) of the heating water tank.

17. Melting and metering assembly according to claim 13, characterized in that the said circulating means comprises:

a pipe (4100) putting the said heating water tank (400) and the said tank/furnace (1) in communication by means of a feed pump (4110), and a permanent orifice (402) in the base of said tank/furnace putting said tank/furnace (1) and said heating water tank (400) in communication.

18. Melting and metering assembly according to claim 13, characterized in that said protection means comprises a hopper (430).

19. Melting and metering assembly according to claim 18, characterized in that the said hopper (430) has a frustoconical shape.

* * * * *